(12) United States Patent
Wang et al.

(10) Patent No.: US 12,467,744 B2
(45) Date of Patent: Nov. 11, 2025

(54) DEPTH DATA MEASURING DEVICE AND STRUCTURED LIGHT PROJECTION UNIT

(71) Applicant: SHANGHAI PERCIPIO TECHNOLOGY LIMITED, Shanghai (CN)

(72) Inventors: Minjie Wang, Shanghai (CN); Yushi Liang, Shanghai (CN)

(73) Assignee: SHANGHAI PERCIPIO TECHNOLOGY LIMITED, Shanghai (CN)

( * ) Notice: Subject to any disclaimer, the term of this patent is extended or adjusted under 35 U.S.C. 154(b) by 421 days.

(21) Appl. No.: 18/016,670

(22) PCT Filed: Jul. 22, 2021

(86) PCT No.: PCT/CN2021/107785
§ 371 (c)(1),
(2) Date: Jan. 17, 2023

(87) PCT Pub. No.: WO2022/017441
PCT Pub. Date: Jan. 27, 2022

(65) Prior Publication Data
US 2023/0296372 A1  Sep. 21, 2023

(30) Foreign Application Priority Data

Jul. 22, 2020 (CN) .......................... 202010712929.2
Apr. 20, 2021 (CN) .......................... 202110423508.2
Apr. 20, 2021 (CN) .......................... 202110423509.7

(51) Int. Cl.
*G06T 7/521* (2017.01)
*G01B 11/22* (2006.01)
(Continued)

(52) U.S. Cl.
CPC ........ *G01B 11/22* (2013.01); *G02F 1/136277* (2013.01); *G06T 7/521* (2017.01);
(Continued)

(58) Field of Classification Search
None
See application file for complete search history.

(56) References Cited

U.S. PATENT DOCUMENTS 3,682,553 A    8/1972  Kapany
10,902,623 B1 * 1/2021 Li .......................... G06T 7/521
(Continued)

FOREIGN PATENT DOCUMENTS

CN    102621546 A    8/2012
CN    103581625 A    2/2014
(Continued)

*Primary Examiner* — Tyler W. Sullivan
(74) *Attorney, Agent, or Firm* — IPro, PLLC (57) ABSTRACT

Disclosed is a depth data measuring device comprising a structured light projection unit and an imaging unit. The projection unit includes a laser generator and an LCOS (Liquid Crystal on Silicon) element for generating structured light to illuminate a subject. The LCOS enables fine projection and supports various patterns (e.g., speckles, stripes), enhancing depth imaging accuracy across scenarios. Integration with a VCSEL structure reduces power consumption and allows miniaturization. Additionally, multiple photosensitive units sharing part of the optical path are introduced to shorten the imaging time required for multi-frame depth calculation, thereby improving the frame rate.

15 Claims, 5 Drawing Sheets

(51) Int. Cl.
*G02F 1/1362* (2006.01)
*G06T 11/00* (2006.01)
*H01S 5/183* (2006.01)
*H04N 23/13* (2023.01)

(52) U.S. Cl.
CPC ........ *G06T 11/003* (2013.01); *H01S 5/18355* (2013.01); *H04N 23/13* (2023.01); *G06T 2207/20221* (2013.01)

(56) References Cited

U.S. PATENT DOCUMENTS

| | | | |
|---|---|---|---|
| 11,989,896 B2* | 5/2024 | Schindler | G06V 20/647 |
| 2004/0125205 A1 | 7/2004 | Geng | |
| 2004/0246473 A1 | 12/2004 | Hermary et al. | |
| 2005/0219552 A1 | 10/2005 | Ackerman et al. | |
| 2010/0079581 A1 | 4/2010 | Russell et al. | |
| 2011/0037953 A1 | 2/2011 | Nizani et al. | |
| 2012/0025112 A1* | 2/2012 | Li | G01F 23/292 |
| | | | 250/577 |
| 2013/0127854 A1 | 5/2013 | Shpunt et al. | |
| 2013/0155418 A1 | 6/2013 | Shaw et al. | |
| 2015/0070472 A1 | 3/2015 | Chen et al. | |
| 2018/0176544 A1 | 6/2018 | Wang et al. | |
| 2020/0284883 A1* | 9/2020 | Ferreira | G01S 7/4815 |
| 2023/0078604 A1* | 3/2023 | Rein | G06T 7/73 |
| | | | 382/103 |

FOREIGN PATENT DOCUMENTS

| | | | | |
|---|---|---|---|---|
| CN | 103780844 | A | 5/2014 | |
| CN | 103868472 | A | 6/2014 | |
| CN | 104197861 | A | 12/2014 | |
| CN | 204902786 | U | 12/2015 | |
| CN | 107369156 | A | 11/2017 | |
| CN | 108650447 | A | 10/2018 | |
| CN | 109889690 | A | 6/2019 | |
| CN | 110501836 | A | 11/2019 | |
| CN | 209927097 | U | 1/2020 | |
| CN | 110926369 | A | 3/2020 | |
| CN | 111239729 | A | 6/2020 | |
| CN | 111692987 | A | 9/2020 | |
| CN | 111721238 | A | 9/2020 | |
| CN | 111721239 | A | 9/2020 | |
| CN | 111829449 | A | 10/2020 | |
| CN | 212747701 | U | 3/2021 | |
| CN | 212779131 | U | 3/2021 | |
| CN | 212779132 | U | 3/2021 | |
| JP | H0791927 | A | 4/1995 | |
| JP | H10170239 | A | 6/1998 | |
| JP | H10213423 | A | 8/1998 | |
| JP | 2001108417 | A | 4/2001 | |
| JP | 2003166813 | A | 6/2003 | |
| JP | 2003228125 | A | 8/2003 | |
| JP | 2008224629 | A | 9/2008 | |
| JP | 2015501938 | A | 1/2015 | |
| JP | 2015102485 | A | 6/2015 | |
| JP | 2020053034 | A | 4/2020 | |
| NL | 2015160 | A * | 7/2016 | ......... G01N 21/8806 |
| WO | 2018225517 | A1 | 12/2018 | |
| WO | 2019113445 | A2 | 6/2019 | |
| WO | 2019209064 | A1 | 10/2019 | |
| WO | 2020235348 | A1 | 11/2020 | |

* cited by examiner

DEPTH DATA MEASURING DEVICE AND STRUCTURED LIGHT PROJECTION UNIT

TECHNICAL FIELD

The disclosure herein relates to the field of three-dimensional imaging, in particular to a depth data measuring device and a structured light projection unit.

BACKGROUND

A depth camera is a measuring device that obtains depth information of a target object. This type of camera is widely used in 3D scanning, 3D modeling and other fields. For example, more and more smartphones are now equipped with depth cameras for face recognition.

Although 3D imaging has been a research hotspot in the field for many years, the existing depth cameras still have many problems such as high power consumption, large size, poor anti-interference ability, and inability to achieve fine real-time imaging. Thus, an improved depth data measuring device is needed.

SUMMARY

A technical problem to be solved by the present disclosure is to provide an improved depth data measuring device, which uses Liquid Crystal on Silicon (LCOS) to perform fine projection of structured light, thereby improving the imaging accuracy of depth data. LCOS can also transform various projection codes including speckles or stripes to adapt to various imaging scenarios. Further, a Vertical Cavity Surface Emitting Laser (VCSEL) structure can be used to realize low power consumption and miniaturization of the projection unit.

According to a first aspect of the present disclosure, a depth data measuring device is provided, comprising: a projection unit, configured to project structured light to the subject; an imaging unit, configured to photograph the subject to obtain a two-dimensional image frame illuminated by the structured light, wherein, the projection unit includes: a laser configured to generate laser light; an LCOS (Liquid Crystal on Silicon) element configured to receive the laser light and generate the structured light for projection.

Optionally, the laser comprises: a VCSEL (Vertical Cavity Surface Emitting Laser), configured to generate the laser light.

Optionally, the characteristics of VCSEL can be used to generate polarized light, and the LCOS element is configured to control the reflection of the light by adjusting the phase difference of the liquid crystal corresponding to each pixel.

Optionally, the VCSEL comprises a light-emitting array composed of a plurality of light-emitting cells, and the VCSEL turns off a specific row, column or light-emitting cell according to the projected structured light pattern when emitting laser light.

Optionally, the device can be a monocular imaging device, wherein the imaging unit further comprises: an image sensor with a fixed relative distance from the projection unit, wherein the two-dimensional image frame of the structured light captured by the image sensor is used for comparison with a reference structured light image frame to obtain the depth data of the subject. A replacement, the device may be a binocular imaging device, and the imaging unit further comprises: first and second image sensors with a fixed relative distance from the projection unit, configured to photograph the subject to obtain first and second two-dimensional image frames illuminated by the structured light, wherein, the depth data of the subject is obtained based on the first and second two-dimensional image frames and the predetermined relative positional relationship between the first and second image sensors.

Optionally, the structured light projected by the projection unit is infrared structured light, and the depth data measuring device further comprises: a visible light sensor, configured to photograph the subject to obtain a two-dimensional image frame illuminated by visible light.

Optionally, the LCOS element is configured to: project encoded speckles in a two-dimensional distribution, and, the imaging unit is configured to synchronously capture the projected speckle structured light in two-dimensional distribution to obtain the two-dimensional image frame. And the LCOS element can be configured to: sequentially project a set of structured lights with different stripe codes, and, the imaging unit is configured to capture each projected structured light to obtain a set of two-dimensional image frames, and the set of two-dimensional image frames is jointly used to obtain the depth data of the subject once.

Specifically, the LCOS element is configured to project the stripe code in a scanning manner, and the imaging unit includes: a rolling shutter sensor, configured to synchronously turn on the pixel column in the stripe direction corresponding to the current scanning position for imaging.

As a supplement or alternative, the laser is a VCSEL comprising a light-emitting array of a plurality of light-emitting cells, and is configured to: partially light up the column of VCSEL light-emitting cells, the imaging unit comprises: a rolling shutter sensor, configured to synchronously turn on the pixel column in the stripe direction corresponding to the lighting position of the currently lit light-emitting cell column for imaging.

Optionally, the projection unit is configured to: in one imaging cycle, project a stripe-coded pattern in multiple periods, wherein each period projects a part of the pattern, and the parts projected in the multiple periods can be combined into a complete stripe coding pattern, and the imaging unit is configured to: in each time period, turn on the pixel column of the corresponding part of the projected pattern for imaging the projected pattern part, and turn on the other pixel columns for imaging the ambient light.

Optionally, the projection unit is configured to: project a set of structured light with different patterns to the shooting area, the set of structured light includes at least two different structured light patterns, the image sensor included in the imaging unit is configured to: photographing the subject to obtain a set of image frames illuminated by the set of structured light for a single depth data calculation of the shooting area, wherein, the image sensor includes at least two sub-image sensors sharing at least part of the optical path, and the at least two sub-image sensors are configured to respectively image different patterns of structured light successively projected by the projection unit.

Thus, the device further comprises: a synchronization unit, configured to cause at least two sub-image sensors to sequentially image at least two different structured light patterns at a first interval synchronously, while the projection unit projects the at least two different patterns of structured light at the first interval, wherein the first interval is smaller than a frame imaging interval of the sub-image sensors.

Furthermore, the synchronization unit can be configured to: cause each sub-image sensor to perform its next frame imaging at a second interval, which is synchronized with the projection operation of the projection unit, wherein the second interval is not smaller than a frame imaging interval of the sub-image sensor.

Optionally, the image sensor comprises: a lens unit, for receiving the incident return structured light; an optical path conversion unit, for changing the optical path to deliver the incident return structured light to the first sub-image sensor and the first sub-image sensor; the first sub-image sensor and the second sub-image sensor are configured to image different patterns at different times.

According to a second aspect of the present disclosure, a structured light projection unit is provided, the unit comprises: a VCSEL (Vertical Cavity Surface Emitting Laser), configured to generate the laser light; an LCOS (Liquid Crystal on Silicon) element, configured to receive the laser light and generate structured light for projection. Further, the unit can comprise: a diffuser arranged on the propagation path of the laser, for converting the laser generated by the VCSEL into a surface light source; a shaping optical component, for providing the surface light source generated by the diffuser to the LCOS element; and a lens group, for outwardly projecting the structured light generated by the LCOS element.

Therefore, the depth data measuring device of the present disclosure uses LCOS to perform fine projection of structured light, thereby improving the imaging accuracy of depth data, and is especially suitable for depth data measurement of tiny objects or details. LCOS can also transform and generate various projection codes including speckle or stripes to adapt to various imaging scenarios. The VCSEL structure can be used to achieve low power consumption and miniaturization of the projection device. The VCSEL can have an array structure and can partially emit light to further reduce power consumption and component heating. Furthermore, multiple sub-image sensors arranged coaxially can be used to realize fast imaging in the scene of multi-pattern merging.

BRIEF DESCRIPTION OF FIGURES

The above and other objects, features and advantages of the present disclosure will become more apparent by describing the exemplary embodiments of the present disclosure in more detail with reference to the accompanying drawings, wherein, in the exemplary embodiments of the present disclosure, the same reference numerals generally represent same parts.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The three-dimensional measurement method based on structured light detection adopted in the present disclosure can perform three-dimensional measurement on the object surface in real time.

The three-dimensional measurement method based on structured light detection is a method that can perform real-time three-dimensional detection on the surface of moving objects. Briefly speaking, the measurement method first projects a two-dimensional laser texture pattern with encoded information (such as a discretized speckle pattern) on the surface of an object, and laser texture is continuously photographed by another image acquisition unit with a relatively fixed position, and the processing unit compare the photographed laser texture pattern with the reference surface texture pattern of known depth distance stored in the memory in advance, calculate the depth distance of each laser texture sequence segment projected on the object surface based on the difference between the captured texture pattern and the known reference texture pattern, and thus the three-dimensional data of the surface of the object to be measured is obtained. The three-dimensional measurement method based on structured light detection adopts the method of parallel image processing, so it can detect moving objects in real time, and has the advantages of fast and accurate three-dimensional measurement, and is especially suitable for use environments that require high real-time measurement.

Figure 1:
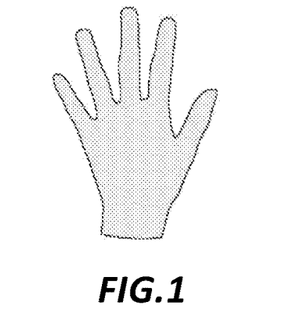
FIG. 1 shows a schematic diagram of an example of an object to be measured.
Figures 2, 3:
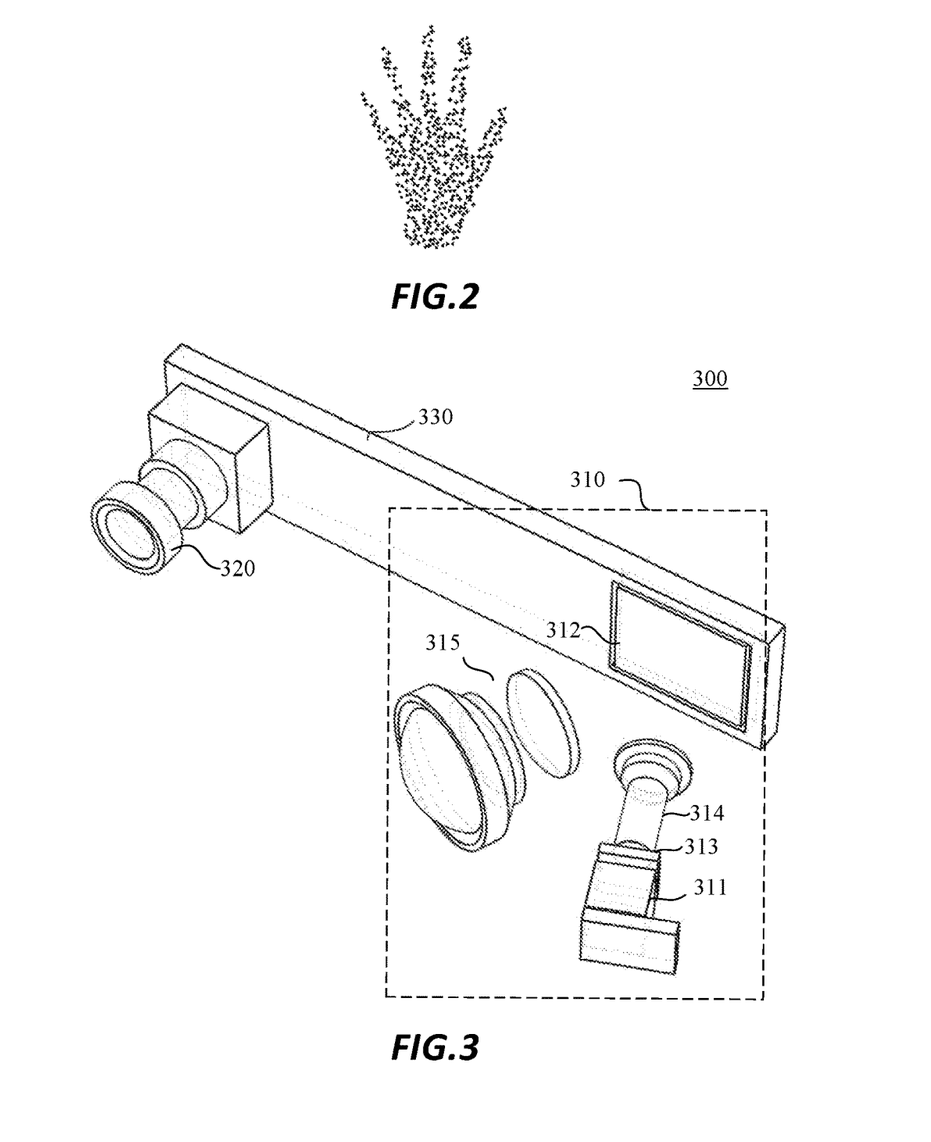
FIG. 2 shows a schematic diagram of speckles projected by the laser beam onto the surface of the object to be measured.
FIG. 3 shows a schematic structural diagram of a depth data measuring device according to an embodiment of the present disclosure.

FIG. 1 shows a schematic diagram of an example of an object to be measured. The figure shows an example of a human hand as the object to be tested. FIG. 2 shows a schematic diagram of discrete speckles projected by the laser beam onto the surface of the object to be measured. In the monocular imaging scene, the captured discrete speckle image shown in FIG. 2 can be compared with the reference standard image to calculate the depth data of each discrete speckle, and thus integrate the overall depth data of the object to be measured. It can be seen from FIG. 2 that since there is a certain distance between the discrete laser speckles, the speckle information is less for the thinner and narrower projection surface, so it is easy to lose part of the real depth information.

In the prior art, there is a lack of a structured light projection unit capable of performing fine projection, so it is impossible to perform high-precision depth data measurement on fine objects.

Thus, the present disclosure provides an improved depth data measuring device, which uses LCOS to perform fine projection of structured light, thereby improving the imaging accuracy of depth data. LCOS can also transform various projection codes including speckles or stripes, which is suitable for various imaging scenarios. Further, the VCSEL structure can be used to realize low power consumption and miniaturization of the projection unit.

FIG. 3 shows a schematic structural diagram of a depth data measuring device according to an embodiment of the present disclosure. As shown, the depth data measuring device 300 includes a projection unit 310 and an imaging unit 320.

The projection unit 310 is configured to project the structured light to the subject. The imaging device 320 is configured to photograph the subject to obtain a two-dimensional image frame illuminated by the structured light.

In order to show the internal structure of the projection unit 310, FIG. 3 does not show the casing and/or fixing parts of the projection unit 310, which can be used to fix the relative positions of the various components shown in the figure, and it can protect the device from external pollution and external impact damage.

As shown, the projection unit for projecting structured light mainly includes two elements: a laser 311 and a liquid crystal on silicon (LCOS) element 312.

Here, the laser 311 is configured to generate laser light. The LCOS element is used as the generator of the projection pattern, configured to acquire said laser light and generate structured light for projection. Thus, extremely high-precision projection pattern control is realized by utilizing the LCOS. Further, the opening and closing of each pixel of the LCOS device can be controlled by, for example, a processing unit inside or outside the device, so as to generate different projected structured light patterns. This expands the application scenarios of the device.

Here, LCOS (Liquid Crystal on Silicon) is a very small matrix liquid crystal display element based on reflection mode. This matrix is fabricated on a silicon chip using CMOS technology.

Specifically, LCOS can use a Complementary Metal-Oxide-Semiconductor (CMOS) integrated circuit chip coated with liquid crystal silicon as the substrate of a reflective Liquid Crystal Display (LCD). It is polished by advanced technology and plated with aluminum as a reflector to form a CMOS substrate. Then, the CMOS substrate is bonded to the glass substrate containing transparent electrodes, and then injected into the liquid crystal package. LCOS places the control circuit behind the display element, which can improve the light transmittance, thereby achieving greater light output and higher resolution.

LCOS can be regarded as a type of LCD. Traditional LCDs are made on glass substrates, while LCOS is made on silicon wafers. Due to the reflective projection, the light utilization efficiency can reach more than 40%. The structure of the LCOS panel is similar to that of a Thin Film Transistor (TFT) LCD. A partition is placed between the upper and lower substrates for isolation, and then liquid crystal is filled between the substrates to form a light valve. The rotation of the liquid crystal molecules is driven by the switch of the circuit, thereby determining the brightness and darkness of the projection. The upper substrate of the LCOS panel can be Indium Tin Oxide (ITO) conductive glass, and the lower substrate can be a CMOS substrate coated with liquid crystal silicon. Since the material of the lower substrate is single crystal silicon, it has good electron mobility, and single crystal silicon can form thinner lines, so high resolution can be achieved. The pixel pitch (i.e., the horizontal distance between two pixels of the same color) of existing LCOS devices can be as small as 8 to 20 microns (10-6).

In the present disclosure, since the laser projects light of a single wavelength, such as projecting infrared light, (for example, 940 nm infrared light), the LCOS element used in the present disclosure is configured to generate a pattern for one wavelength (i.e., requires only "monochrome") projection, which is different from the LCOS panels commonly used to display RGB three colors in the prior art. Therefore, the LCOS element of the present disclosure can have a smaller pixel pitch, thereby realizing the projection of extremely fine structured light patterns.

In one embodiment, the laser 311 includes or is implemented by a VCSEL (Vertical Cavity Surface Emitting Laser). The VCSEL is configured to generate the laser light. Thus, the vertical emission of the VCSEL can be utilized to further reduce the size, power consumption and heat generation.

Further, as shown in FIG. 3, the projection unit 310 can further include: a diffuser 313 arranged on the propagation optical path of the laser light, so as to convert the laser light generated by the VCSEL into surface light source. Thus, the background light required by the LCOS element 312 is provided. Further, the projection unit can further include: a shaping optical component 314, configured to shape the surface light source generated by the diffuser (for example, shape it into a shape conforming to the LCOS element) and provide it to the LCOS element.

In addition, the projection unit 310 can further include: a lens group for projecting the structured light generated by the LCOS element.

Due to the use of LCOS for projection using the principle of reflection, the laser and projection lens group can be arranged on a folded optical path as shown in the figure, thereby contributing to the compactness and miniaturization of the device. The laser light emitted by the laser 311, such as VCSEL, is sent to the LCOS 312 through the diffuser 313 and the shaping component 314, and is projected and sent out by the lens group 315 after being reflected by the relevant liquid crystal inside the LCOS 312.

It should be understood that although the diffuser 313, the shaping optical assembly 314 and the lens group 315 for projection are shown in the figure, in other embodiments, one or more of the above components can be omitted (for example, by making the VCSEL The output shape of 311 directly conforms to the cross-sectional shape required by the LCOS, omitting the shaping optical component 314), or replacing or adding other components. All such conventional optical modifications are within the scope of this disclosure.

Further, based on the principle that LCOS reflects polarized light, the VCSEL 311 can directly generate polarized light, and the LCOS element controls the reflection of light by adjusting the phase difference of the liquid crystal corresponding to each pixel. Since the LCOS 312 projects polarized light through the lens group 315, it can reduce the adverse effect of specular reflection on the imaging quality of the imaging unit 320, thereby improving the imaging quality. Further, the device can also be used for high-precision flaw inspection of reflective surfaces (e.g., glass surfaces).

In addition, although the LCOS 312 itself is a pixel matrix composed of multiple pixels, and the projected pattern can be precisely controlled by controlling the "switching" of each pixel (for example, controlling the angle of the liquid crystal in the pixel to the incident polarized light). However, on the other hand, the VCSEL 311 can also include a matrix structure, such as a light emitting array composed of a plurality of light emitting cells. Thus, in some embodiments, the VCSEL 311 can also turn off a specific row, column or light-emitting cell according to the projected structured light pattern when emitting laser light. In other words, although the VCESL 311 is used as the surface light source of the LCOS 312, the luminous pattern of the VCESL 311 still has a certain correlation with the pattern of the surface light source received by the LCOS 312, and can be precisely fine-tuned by the LCOS 312.

Figure 4:
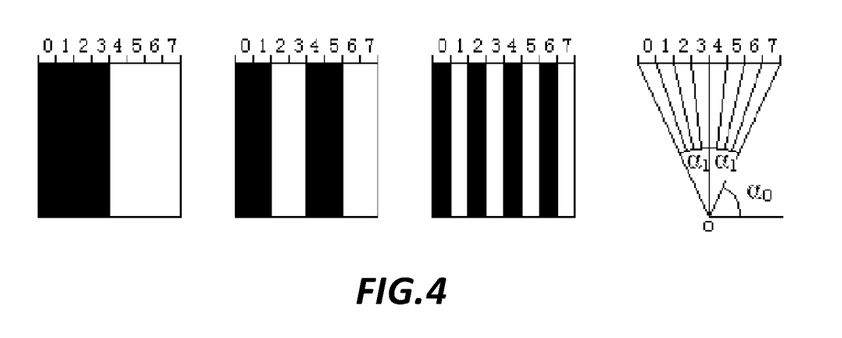
FIG. 4 shows the principle of depth imaging using stripe-coded structured light.

For example, in some cases, the projection unit 310 projects a stripe pattern as structured light and finely images it. According to the principle of structured light measurement, whether the scanning angle α can be accurately determined is the key to the entire stripe pattern measurement system. In this disclosure, the determined scanning angle can be realized by LCOS, while the meaning of image encoding and decoding is to determine the scanning angle of the coded structured light (i.e. surface structured light) system. FIG. 4 shows the principle of depth imaging using stripe-coded structured light. For the convenience of understanding, the coding principle of the striped structured light is briefly described in the figure with a two-gray-level three-bit binary time code. The projection unit can sequentially project three patterns as shown to the measured object in the shooting area, and the three patterns use two gray scales (bright and dark) to divide the projection space into 8 areas. Each area corresponds to a respective projection angle, where it can be assumed that the bright area corresponds to a code "1" and the dark area corresponds to a code "0". Combining the coded values of a point on the scene in the projected space in the three coded patterns according to the projected order, to obtain the area coded value of the point, thereby determining the area where the point is located and decoding to obtain the scan angle of the point.

In projecting the leftmost pattern of FIG. 4, in one embodiment, VCESL 311 is fully lit and projected by LCOS 312 by turning off the left column of pixels corresponding to 0-3. In another embodiment, the VCESL 311 is partially illuminated, e.g., the illumination corresponds to the right portion (usually need not be the exact 4-7, but can be a wider range of 3-7), thereby ensuring the columns of pixels of LCOS 312 corresponding to 4-7 receive sufficient backlight and the pattern is projected by the LCOS 312 by turning off the columns of pixels corresponding to 0-3 on the left.

Therefore, by turning off part of the light emitting cells of the VCSEL during projection, the power consumption of the VCSEL can be further reduced, thereby reducing the heat generated by the device and obtaining more rest time for each light emitting cell of the VCSEL. Therefore, it is especially suitable for use in a heat-sensitive scene, and can prolong the life of the VCSEL. A detailed description will be given below in conjunction with the stripe light pattern projection of FIGS. 5 and 6.

As shown in FIG. 3, the depth data measuring device of the present disclosure can be a monocular device, that is, only one imaging sensor is included to capture structured light. To this end, the imaging unit 320 can be implemented as an image sensor with a fixed relative distance from the projection unit. The two-dimensional structured light image frame captured by the image sensor is compared with a reference structured light image frame to obtain depth data of the photographed object.

Alternatively, the depth data measuring device of the present disclosure can be a binocular device, that is, it includes two image sensors to capture structured light synchronously, and uses the parallax in the two images to obtain depth data. Therefore, the imaging unit can include: first and second image sensors with a fixed relative distance from the projection unit, configured to photograph the object, thereby obtaining the first and second two dimensional image frames under the illumination of the structured light. Thus, the depth data of the subject is obtained based on the predetermined relative positional relationship between the first and second image sensors and the first and second two-dimensional image frames.

In a binocular imaging system, the above-mentioned decoding process of the stripe code shown in FIG. 4 can be simplified by directly matching the coded values of each point in the first and second image sensors. In order to improve the matching accuracy, the number of projected patterns in the time code can be increased, such as a five-bit binary time code with two gray levels. In the application scenario of binocular imaging, this means that, for example, each pixel in each image frame on the left and right contains 5 region encoding values (0 or 1), so that the left and right images can be matched with higher accuracy (for example, pixel level). Under the condition that the projection rate of the projection unit remains unchanged, compared with the three coding patterns in FIG. 4, the five coding patterns are equivalent to realizing higher-precision image matching at a greater cost in the time domain. This is still quite desirable when the projection rate of the projection unit is extremely high (e.g., fast switching of LCOS projection patterns).

As mentioned above, the structured light projected by the projection unit is preferably infrared structured light, thereby avoiding the interference of visible light. Therefore, the depth data measuring device of the present disclosure can further include: a visible light sensor, configured to photograph the subject to obtain a two-dimensional image frame illuminated by visible light. For example, an RGB sensor can be included to obtain the color two-dimensional information of the subject to be combined with the obtained depth information, for example to obtain three-dimensional information, or to supplement or correct the depth information. In other embodiments, since the instantaneous light intensity of projected structured light is usually much greater than that of ambient light, the laser can also generate laser light in the visible light band, so that the projection unit projects the structured light in the visible light band.

The LCOS element can be configured to: respectively project a group of structured light with different stripe codes (for example, three groups as shown in FIG. 4, or more groups of stripe patterns), and the imaging unit can be configured to photograph each structured light pattern synchronously to acquire a set of 2D image frames. The group of 2D image frames is jointly used to obtain the depth data of the object once.

In some cases, the projection unit (i.e., LCOS element combined with a laser) can project a complete pattern at a time. In other cases, LCOS elements can be combined with a laser implemented as a VCSEL for projecting the stripe code in a scanning manner (Here, "projecting . . . in a scanning manner" means that the entire image is not projected at the same time, but only a part of the complete pattern is projected at each moment and the projection within a certain period of time can synthesize a complete projected pattern), and the imaging unit includes: a rolling shutter sensor that synchronously turns on the pixel column in the stripe direction corresponding to the current scanning position for imaging. For example, VCSEL can turn on some columns of its own, and cooperate with the reflection of LCOS in turn (that is, LCOS projects the structured light pattern of several columns that are lit in turn), and synchronize with the opening of the pixel columns of the rolling shutter sensor. Thus, the heat dissipation of the VCSEL is further reduced, and the interference of ambient light on structured light imaging is avoided.

Figure 5:
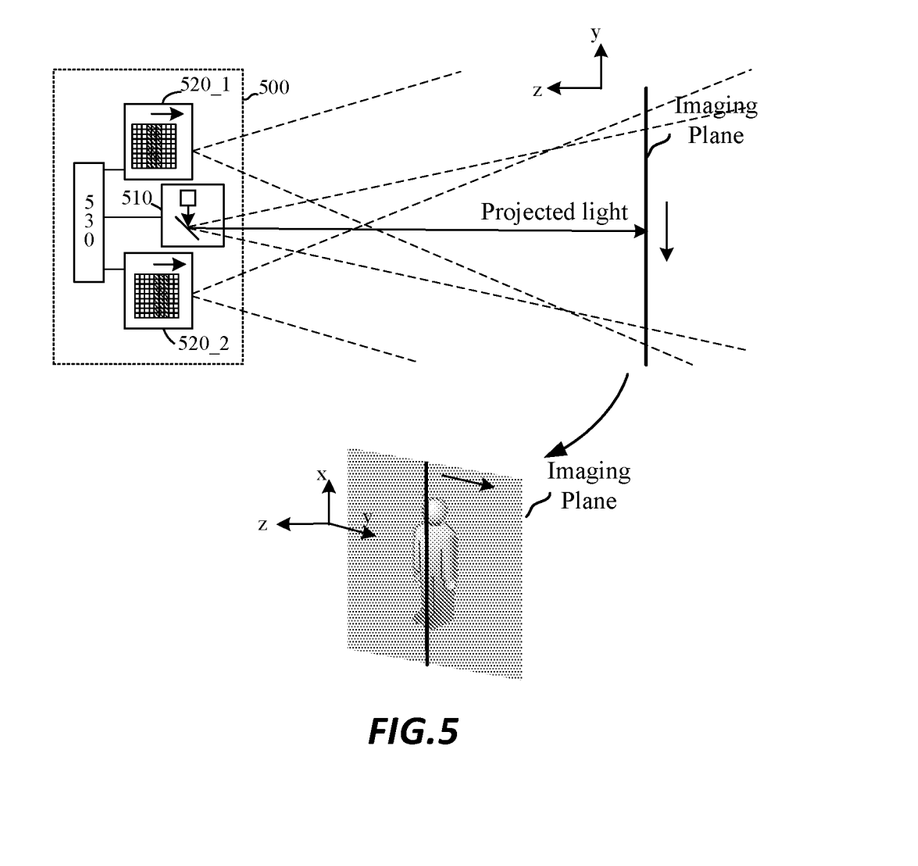
FIG. 5 shows the composition of a depth data measuring device according to an embodiment of the present disclosure.

FIG. 5 shows an example of the composition of a depth data measuring device according to an embodiment of the present disclosure. As shown, the depth data measuring device 500 includes a projection unit 510 and two image sensors 520_1 and 520_2.

The projecting unit 510 is used for scanningly projecting structured light with stripe codes to the shooting area. For example, in three consecutive image frame projection cycles, the projection unit 510 can project three patterns as shown in FIG. 4 successively, and the imaging results of these three patterns can be used to generate depth data. 520_1 and 520_2, which can be referred to as the first and second image sensors respectively, have a predetermined relative positional relationship, and are used to photograph the shooting area to respectively obtain the first and second two-dimensional image frames illuminated by structured light. For example, in the case that the projection unit 510 projects three patterns as shown, the first and second image sensors 520_1 and 520_2 can respectively image the shooting area (for example, the imaging plane in FIG. 5 and the area within a certain range before and after the plane) projected with the three patterns in three synchronized image cycle imaging periods for imaging.

As shown in FIG. 5, the projection unit 510 projects line-shaped light (extended in the x direction) in the z direction (i.e., toward the shooting area). Specifically, one or more pixel columns (line-shaped light) can be reflected by the LCOS in the projection unit 510. The projected line-shaped light can move continuously in the y-direction to cover the entire imaging area. The column-by-column turn-on mirrors of LCOS can realize the continuous movement of the line light in the y direction. It should be understood that the LCOS will keep the mirrors of the dark stripes off based on the currently projected stripe pattern during the process of turning on the mirrors column by column. The lower part of FIG. 5 provides a more comprehensible illustration of the scanning of the line-shaped light for the perspective view of the shooting area.

In the embodiments of the present disclosure, it is assumed that the direction of the light emitting device is the z direction, the vertical direction of the imaging plane is the x direction, and the horizontal direction is the y direction. Therefore, the striped structured light projected by the projection unit can be the result of the line-shaped light extending in the x direction moving in the y direction. Although in other embodiments, synchronization and imaging processing can also be performed on the striped structured light obtained by moving the line-shaped light extending in the horizontal y direction in the x direction, it is still preferred to use vertical striped light for illustration in this disclosure.

Further, the measuring device 500 also includes a synchronization unit 530, for example, can be realized by a processing unit described below. The synchronization unit 530 is respectively connected to the projection unit 510 (including both the VCSEL and the LCOS) and the first and second image sensors 520_1 and 520_2 to achieve precise synchronization among the three. Specifically, based on the scanning position of the projection unit 510, the synchronization unit 530 can synchronously turn on the pixel columns in the stripe direction corresponding to the current scanning position in the first and second image sensors 520_1 and 520_2 to perform imaging. As shown in FIG. 5, the current stripe is scanning to the center area of the shooting area. Thus, in the image sensors 520_1 and 520_2, the pixel columns (for example, three adjacent pixel columns) located in the central area are turned on for imaging. As the stripes move in the y direction (shown by the arrows in the lower perspective view of FIG. 5), the pixel columns turned on for imaging in the image sensors 520_1 and 520_2 also move synchronously (shown by the arrows above the matrix in the upper left block diagram of FIG. 5). In this way, the one-dimensional characteristic of the stripe image can be used to control the range of the pixel column for imaging at each moment, thereby reducing the adverse influence of ambient light on the measurement result. In order to further reduce the influence of ambient light, the projection unit is especially configured to project light that is not easily confused with ambient light, such as infrared light. In addition, since the correspondence between the pixel column and the scanning light is affected by many factors such as the width, power, and speed of the projected light and photosensitive efficiency of the image sensor, the range (and corresponding number) of pixel columns that are turned on each time can be determined based on calibration operation.

In the example of FIG. 5, the projection of line-shaped light in a scanning manner can be realized by turning on the reflectors of the LCOS column by column (or by multiple columns) as described above, or by lighting up the VCSEL column by column or partly, or by both.

As mentioned above, a VCSEL can include a light-emitting array composed of multiple light-emitting cells, and can turn off a specific row, column or light-emitting cell according to the projected structured light pattern when emitting laser light. Therefore, in some embodiments, the columns of the VCSEL light-emitting cells can be partially lighted, and the rolling shutter sensor simultaneously turns on the pixel columns in the stripe direction corresponding to the illuminated positions of the currently lit light-emitting cell columns to perform imaging. Partial lighting can be lit column by column, or multiple columns (adjacent or spaced) together, as long as the superposition of multiple lighting can illuminate the entire pattern range.

In this case, during the imaging time of a whole image, LCOS can maintain the switch shape of the image to be projected, and realize scanning projection for stripe patterns by lighting up the VCSEL column by column or by block (that is, multiple columns are lit at the same time). For example, when the projection unit needs to project the third pattern in FIG. 4, the pixel columns corresponding to 0, 2, 4, and 6 in the LCOS are turned off, and the pixel columns corresponding to 1, 3, 5, and 7 are turned on. The light-emitting cells of the VCSEL can be lit up column by column to complete line-shaped light scanning in the y direction with the cooperation of LCOS. Since the number of light-emitting cell columns of VCSEL is much smaller than the number of pixel columns of image sensors, the projected "line-shaped light" can have a larger line width (the "stripe light" separated by dotted lines in FIG. 6 below), and the lighting time of one light-emitting column corresponds to the sum of the exposure time of multiple pixel columns in the image sensor. As an alternative, the LCOS can also be partially turned on corresponding to the stripe pattern following the illuminated portion of the light-emitting cell column. In other embodiments, the LCOS element can also be used to project two-dimensionally distributed coded discrete speckles, and the imaging unit is used to simultaneously photograph the projected two-dimensionally distributed structured light to obtain the two-dimensional image frame. For example, LCOS elements can project discrete speckles as shown in FIG. 2 (but with much higher precision and the subject is usually much smaller).

As mentioned above, the structured light projected by the projection unit is preferably infrared structured light, thereby avoiding the interference of visible light. Therefore, the depth data measuring device of the present disclosure can further include: a visible light sensor, configured to photograph the subject to obtain a two-dimensional image frame illuminated by visible light. For example, an RGB sensor can be included to obtain color two-dimensional information of the subject, which can be combined with the obtained depth information to obtain three-dimensional information, or as a supplement or correction to the depth information.

In some embodiments, even one image sensor (for example, the same CMOS imaging element) can be used to simultaneously acquire the structured light pattern and the ambient light image in the same imaging cycle. Therefore, the structured light projected by the projection unit can also be located in the visible light band, and since the instantaneous light intensity of the projected light is much greater than that of the ambient light, the structured light can still be imaged well. The structured light projected by the projection unit can also be located in the non-visible light band, for example, to project infrared structured light. In this case, the filter in front of the image sensor can be removed, or such a filter can be selected, which has a wider pass band and can make the structured light and ambient light are passed through.

In an embodiment where one image sensor is used to simultaneously acquire structured light patterns and ambient light images in the same imaging cycle, the image sensor needs to be a specially manufactured sensor whose pixels can be controlled separately, and the projection unit needs to project a complete striped structured light pattern in segments.

Thus, the projecting unit can be configured to project the stripe coding pattern in multiple time periods within one imaging cycle, wherein each time period projects a part of the pattern, and the pattern parts projected in the multiple periods can be combined into a complete stripe-coded pattern. Correspondingly, the imaging unit can be configured to turn on the pixel column of the corresponding part of the projected pattern for imaging the projected pattern part, and turn on the other pixel columns for imaging the ambient light in each time period.

Figure 6:
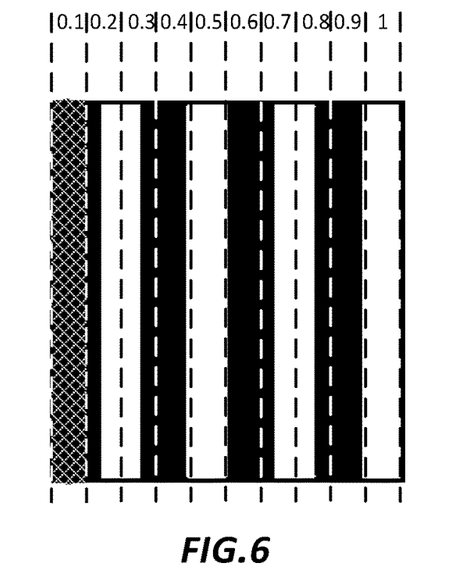
FIG. 6 shows an example of segmentally projecting a stripe code pattern.

FIG. 6 shows an example of segmentally projecting a stripe code pattern. Here, for the convenience of description, it can be assumed that the projection cycle of one image frame of the projection unit is 1 ms, and correspondingly, the imaging cycle of one image frame of the imaging unit is also 1 ms, which is used to image a complete stripe coding pattern (the example shown is the third of the three stripe patterns shown in FIG. 4). The projection unit can divide 1 ms into 10 periods. In 0.1 ms, the projection unit projects the pattern shown in the grid line area, that is, nothing is projected, and the pixels in the part of the imaging unit corresponding to the imaging grid line area are turned on for imaging, and the remaining right pixels (the remaining nine-tenths of pixels) to image ambient light. In the 0.2 ms, the projection unit projects the pattern shown in the area marked as 0.2, that is, only the pattern on the right side is lit, and the pixels in the part of the imaging unit corresponding to the 0.2 area are turned on for imaging, and the remaining of pixels (the remaining nine-tenths of pixels) image ambient light. Thus, the projection and imaging of a complete stripe coding pattern are completed within an imaging cycle of 1 ms.

The segmented projection of the projection unit can be realized by the laser, by the LCOS element, or by the combination of the two. In one embodiment, the LCOS element keeps the pixel column corresponding to the projected pattern turned on and off in a 1 ms cycle, and the VCSEL sequentially lights up its 10 (or 10 groups) light-emitting columns, thereby realizing the complete projection of the pattern. In another embodiment, the light-emitting area of the VCSEL only needs to cover the projection area, and the LCOS element only turns on the pixel columns that should be lit in the corresponding area in each 0.1 ms period. In yet another embodiment, both the light emitting area of the VCSEL and the projection area of the LCOS change synchronously with the area where the pattern should be projected within the cycle.

Correspondingly, the imaging unit can realize simultaneous imaging of structured light and ambient light through various control or structural schemes.

In a simplest embodiment, the imaging unit has columns of pixels, each of which can be individually controlled to be read, and each pixel comprises a storage unit. In an imaging cycle of 1 ms, all pixels can be kept exposed, and the imaging unit only needs to read the storage unit twice, that is before and after the corresponding area is irradiated by the structured light. Before irradiation, the ambient light imaging information with an exposure time of 0.9 ms was read; while after irradiation, the structured light imaging information with an exposure time of 0.1 ms was read.

In another embodiment, each pixel of the imaging unit includes two storage units, the first storage unit is used to store structured light exposure information, and the second storage unit is used to store ambient light exposure information. The imaging unit can switch to receive the exposure information by the first storage unit when the corresponding area is irradiated by the structured light, and switch to receive the exposure information by the second storage unit during other periods.

In yet another embodiment, the imaging unit has a finer pixel exposure control function, so that some pixels in the same segmented exposure area are used for structured light imaging, and some pixels are used for ambient light imaging, so that one imaging unit can simultaneously structured light and ambient light imaging at the expense of reduced resolution. For example, the imaging unit specifies that odd-numbered pixel columns image structured light, and even-numbered pixel columns image ambient light. When the corresponding area is projected with the structured light pattern, the odd-numbered columns are turned on for exposure, and the even-numbered columns are turned on for exposure in other periods. In this embodiment, it is also possible to further expose the structured light with different durations, thereby realizing High Dynamic Range (HDR) imaging effect. For example, the odd pixels in the odd pixel columns can be exposed to the full-time structured light (for example, 0.1 ms), and the even pixels in the odd-numbered pixel columns can be exposed to the half-time structured light (for example, 0.05 ms). During image compositing, unexposed pixel values are selected for display or calculation.

In different embodiments, the device can be implemented as a measuring camera only for realizing the shooting function, and can also include a processing and computing unit. In addition, in the case of including a processing and computing unit, according to different applications, the processing and computing unit can be packaged in the same housing with other components of the measuring device, or connected separately via a signal transmission mechanism.

Although not shown in FIG. 5, the depth data measuring device of the present disclosure can further include: a processing unit (control function) connected to the projection unit and the imaging unit, for controlling the projection of the projection unit and imaging of the imaging unit. For example, the processing unit can be configured to control the switching of pixels of the LCOS element to generate different projected structured light patterns.

In addition, the processing device can also have a calculation function, and is configured to calculate the depth data of the object by using the two-dimensional image frame captured by the imaging unit.

Further, the depth data measuring device of the present disclosure further includes: a casing for accommodating the projection unit and the imaging unit, and fixing the relative positions of the projection unit and the imaging unit. The fixing mechanism 330 shown in FIG. 3 can be regarded as a part of the housing.

In some embodiments, a processing unit for control and/or calculation is included inside the housing. However, in some cases, it is necessary to separate the shooting device and the processing unit. Therefore, the device includes: a signal transmission mechanism connected to the projection unit and the imaging unit through the casing, configured to internally transmit control signals for the projection unit and the imaging unit, and externally transmit the two-dimensional image frame. When the depth data measuring device of the present disclosure includes a processing unit, the above-mentioned signal transmission mechanism is, for example, a signal connection line with the processing device, such as an optical fiber or a coaxial cable. When the device itself does not include a processing function, the above-mentioned signal transmission mechanism is a connection interface with an external processing device.

Figure 7:
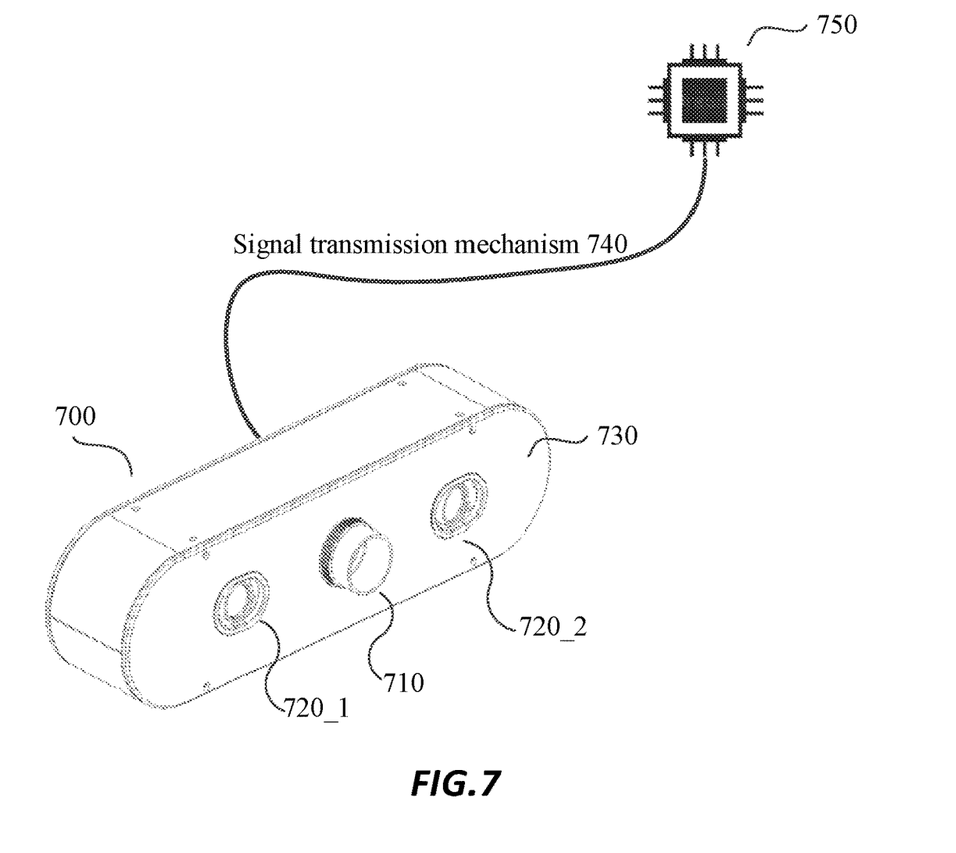
FIG. 7 shows the composition of a depth data measuring device according to an embodiment of the present disclosure.

FIG. 7 shows the composition of a depth data measuring device according to an embodiment of the present disclosure.

As shown, the depth data measuring device includes a separate measuring camera 700, a signal transmission mechanism 740 and a processor 750. FIG. 7 schematically shows a perspective view of a measuring camera 700, a cable diagram of a signal transmission mechanism (transmission cable) 740 and a symbol diagram of a processor 750. It should be understood that in various implementations, the processor 750 can be enclosed by a processor housing alone, or plugged into a computing motherboard of another device, such as the measuring device described below, or otherwise affixed. This disclosure does not limit this.

The measuring camera here completes the active projection of structured light and the binocular measurement function for structured light. The measuring camera 700 includes a structured light projection unit 710, first and second image sensors 720_1 and 720_2 having a predetermined relative positional relationship, and a housing 730.

The structured light projecting unit 710 is configured to project structured light to the subject, and includes the VCSEL combined with the LCOS structure as described above. The first and second image sensors 720_1 and 720_2 are used to photograph the subject to respectively obtain first and second two-dimensional image frames illuminated by the structured light. The casing 730 is used to accommodate the structured light projection unit and the first and second image sensors, and to fix the relative positions of the structured light projection unit and the first and second image sensors.

The signal transmission mechanism 740 can pass through the housing 730 to connect with the structured light projection unit and the first and second image sensors, and is configured to transmit a control signal inward (into the housing) for controlling the projection unit 710 and the first and second image sensors, and transmit the first and second two-dimensional image frames captured by the image sensor to the outside (outside the housing).

The processor 750 is connected to the signal transmission mechanism 740 and is located outside the casing 730, configured to send the control signal through the signal transmission mechanism, and based on the continuously acquired first and second two-dimensional image frames and the predetermined relative positional relationship between the first and second image sensors, calculating motion data of the subject.

Thus, the depth data measuring device of the present disclosure can achieve miniaturization, light weight and low heat dissipation by separating the measuring camera from a processor (e.g., processing circuit), thereby facilitating installation in an imaging space of an equipment, for example, a medical imaging equipment.

Here, the signal transmission mechanism 740 includes a coaxial cable, so that control signals and image data are transmitted directly through electrical signals. In a high magnetic field environment such as MRI acquisition, in order to avoid the use of iron-nickel materials, an optical fiber can be used as the signal transmission connector 740. Therefore, each of the structured light projection unit, the image sensor and the processor includes a photoelectric converter for converting the optical signal transmitted by the optical fiber into an electrical signal, or converting the electric signal to be sent into an optical signal.

In another embodiment, the present disclosure can also be implemented as a structured light projection unit. The projection unit includes: a VCSEL, configured to generate the laser light; and an LCOS element, configured to acquire the laser light and generate structured light for projection. Further, the projection unit includes: a diffuser arranged on the propagation path of the laser light to convert the laser light generated by the VCSEL into surface light; a shaping optical component configured to provide the surface light generated by the diffuser to the LCOS element; and a lens group for outwardly projecting the structured light generated by the LCOS element. The above-mentioned structured light projection unit can cooperate with various imaging units to realize depth data measurement and calculation for various scenes.

The depth data measuring device and the structured light projection unit constituting the device according to the present disclosure have been described in detail above with reference to the accompanying drawings. The disclosure utilizes LCOS to perform fine projection of structured light, thereby improving the imaging accuracy of depth data, and is especially suitable for measuring depth data of tiny objects or details. LCOS can also transform various projection codes including speckle or stripe, which is suitable for various imaging scenarios. Furthermore, the VCSEL structure can be used to achieve low power consumption and miniaturization of the projection unit. The VCSEL can have an array structure and can partially emit light, so as to further reduce power consumption and component heat generation.

In the case that the structured light projected by LCOS is similar to the stripe shown in FIG. 4, due to the property of time-domain imaging of stripe light imaging, multiple sets of patterns are required, and the more patterns used to synthesize a depth image, the more depth information the synthesized depth image contains. However, when the structured light projected by LCOS is similar to the speckle image shown in FIG. 2, although one pattern can be used to obtain depth information, the projection of different speckle patterns for the same object can cover more area in the shooting area, and it can provide higher confidence for a smaller matching window. Therefore, there is also a need for using multiple projection pattern imaging to synthesize a depth image in speckle scenes.

Therefore, in a preferred embodiment of the present disclosure, multiple groups of coaxial sensor structures can also be used to image different patterns separately, so as to improve the overall frame rate of obtaining depth data based on multiple frames. Thus, the problems in the prior art such as failure of dynamic imaging due to too long acquisition time of multiple frames and low frame rate of depth data can be solved. In addition, since an imaging device with a conventional frame rate is introduced, it is possible to avoid the use of high-cost high-frame-rate imaging devices while improving depth imaging accuracy and frame rate.

Therefore, in one embodiment, the projection unit of the depth data measuring device is configured to project a set of structured light with different patterns to the shooting area in a scanning manner, the set of structured light includes at least two different structured light patterns. The image sensor included in the imaging unit is configured to: photograph the subject to obtain a set of image frames illuminated by the group of structured light, for a single depth data calculation of the shooting area. Wherein, each image sensor includes at least two sub-image sensors sharing at least part of the optical path, and the at least two sub-image sensors are configured to respectively image different patterns of structured light successively projected by the projection unit.

Here, the sub-image sensors included in the image sensor that share at least part of the optical path can be configured to take turns to image successively projected patterns in a set of structured light projected by the projection unit until all patterns in a set of structured light are completely imaged, of imaging. For example, the projection unit projects a set of three structured light patterns, such as shown in FIG. 4, and the image sensor includes two sub-image sensors. Then the first sub-image sensor images the first pattern, the second sub-image sensor images the second pattern, and the first sub-image sensor then images the third pattern. In other words, when the number of patterns included in a set of structured light is not greater than the number of sub-image sensors included in an image sensor, different image sub-sensors included in an image sensor can respectively image different patterns. When the number of patterns contained in a group of structured light is greater than the number of sub-image sensors contained in the image sensor, the sub-image sensors need to perform secondary imaging, that is, one sub-image sensor images different patterns at different times.

In some embodiments, the projected pattern is a speckle pattern, e.g., a plurality of different speckle patterns resulting from LCOS transforming on pixels. A set of speckle patterns used to synthesize a depth image preferably have non-overlapping speckle distributions projected into the same area, so as to jointly obtain as much depth information as possible of the same object.

It should be understood that, compared to spatially modulated speckle patterns, stripe light pattern imaging can be regarded as a temporal modulation scheme, that is, different speckle patterns projected at different times to synthesize a frame of depth data with a sufficiently high QE (Quantum efficiency), which can fully charge the exposed pixels of the image sensor in microseconds. Thus, especially in combination with a rolling shutter image sensor, a depth measuring device with a high anti-interference coefficient can be realized.

In some embodiments, the image sensor is a single image sensor as described above, i.e., implemented as a monocular system. In other embodiments, the image sensor comprises two image sensors, i.e., implemented as a binocular system. Monocular and binocular implementations in which one image sensor includes multiple sub-image sensors will be described below with reference to FIG. 8 and FIG. 9.

Figure 8:
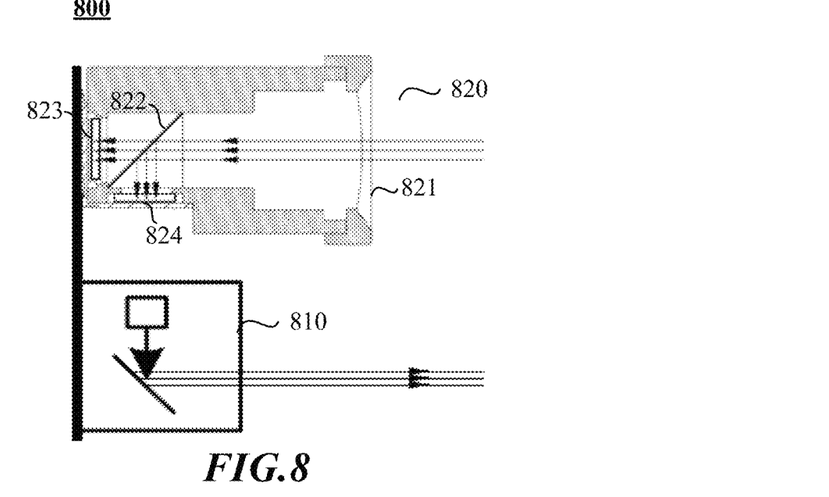
FIG. 8 shows the composition of a depth data measuring camera according to an embodiment of the present disclosure.

FIG. 8 shows the composition of a depth data measuring camera according to an embodiment of the present disclosure. As shown, the depth data measuring camera 800 based on the monocular principle includes a projection unit 810 and an image sensor 820.

Here, the projecting unit 810 can be implemented as a structure including LCOS 310 as shown in FIG. 3, and configured to project a set of different structured light patterns to the shooting area in a scanning manner and the set of structured light includes at least two different structured light patterns. The image sensor 820 is configured to photograph the shooting area to obtain a set of image frames illuminated by the group of structured light for a single calculation of depth data of the shooting area.

For example, the projection unit 810 sequentially projects three patterns as shown in FIG. 4. The three patterns are taken as a set, and the image sensor images each of the patterns, thereby obtaining a set of image frames including 3 frames. According to the principle of monocular imaging, these frames can be compared with their corresponding reference image frames, and used together for one calculation of depth data for the shooting area, that is, one depth frame can be calculated.

Different from the image sensor in conventional measuring equipment that only includes one photosensitive unit, and one photosensitive unit performs imaging three times to obtain image frames in a set of 3 frames, the image sensor 820 shown in FIG. 8 includes at least two sub-image sensors that share at least part of the optical path, and the at least two sub-image sensors respectively image different patterns of structured light successively projected by the projection unit.

FIG. 8 shows an example in which the image sensor 820 includes two sub-image sensors (photosensitive units). As shown, image sensor 820 includes sub-image sensors 823 and 824. The sub-image sensors 823 and 824 share an optical path up to the beam splitting surface of the beam splitting element 822 and are at the same distance from the above beam splitting surface, or at least approximately the same distance. In other words, the present disclosure introduces sensor structures that are coaxial with each other. Here, for example, the sub-image sensor 823 images the structured light of the first pattern among the three patterns in FIG. 4. Subsequently, the sub-image sensor 824 images the structured light of the second pattern among the three patterns. In other words, it can be considered that the sub-image sensor 824 with the same optical path (or a completely equivalent optical path) is in situ, instead of 823, to perform imaging of the latter pattern structured light. Thus, the imaging interval of two adjacent frames can be imaged at a smaller interval without depending on the frame interval of each image sensor.

Figure 9:
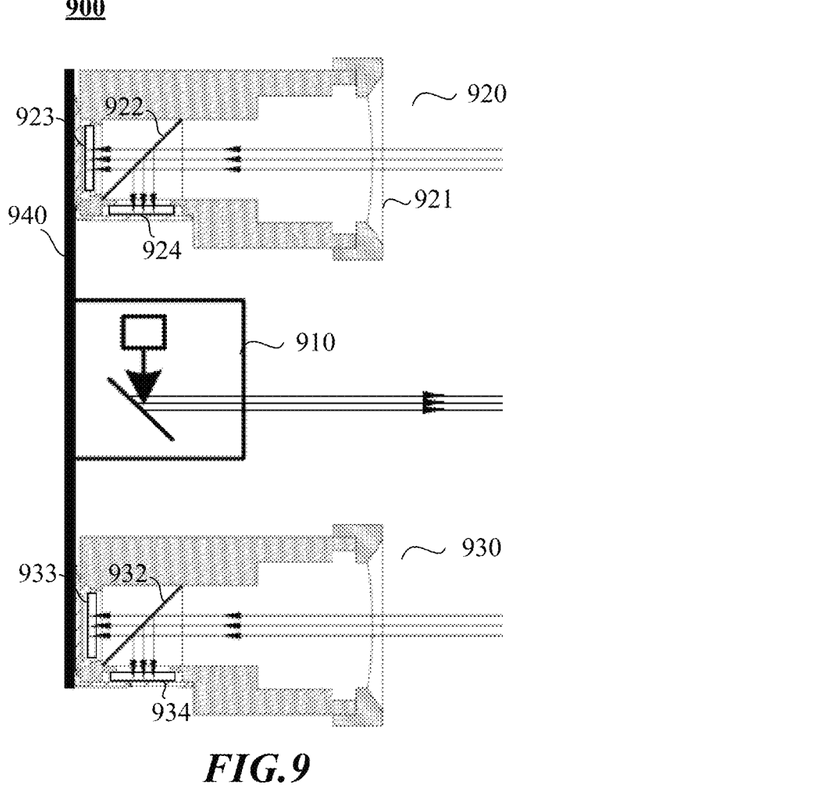
FIG. 9 shows the composition of a depth data measuring camera according to an embodiment of the present disclosure.

Similarly, FIG. 9 shows the composition of a depth data measuring camera according to an embodiment of the present disclosure. An example of the composition of the image sensor is given in more detail than the projection unit shown briefly.

As shown, the depth data measuring camera 900 based on the binocular principle includes a projection unit 910 and a first image sensor 920 and a second image sensor 930 having a predetermined relative positional relationship. Although not shown for convenience of illustration, the measuring camera 900 also includes a casing for surrounding the above-mentioned units, and the connection structure 940 can be regarded as a mechanism for fixing the above-mentioned devices and connecting to the casing. In some embodiments, connection structure 940 is a circuit board that includes control circuitry thereon. It should be understood that, in other implementations, the above-mentioned units 910-930 can be connected to the casing in other ways, and perform corresponding data transmission and command reception operations.

Here, the projection unit 910 is configured to scan and project a group of structured light with different patterns to the shooting area, and the group of structured light includes at least two different structured light patterns. The first image sensor 920 and the second image sensor 930 having a predetermined relative positional relationship are configured to photograph the shooting area to obtain a set of image frame pairs illuminated by the group of structured light. The set of image frames is calculated for a single shot of depth data for the shooting area.

For example, the projection unit 910 sequentially projects three patterns as shown in FIG. 4 (in other embodiments, three speckle patterns are projected). The three patterns are taken as a set, and the image sensor images each of the patterns, thereby obtaining a set of image frame pairs including three pairs (6 frames). These 6 frames are jointly used for one depth data calculation of the shooting area, that is, one depth frame can be calculated.

Different from conventional binocular measurement equipment, the first and second image sensors each include only one photosensitive unit, and each photosensitive unit performs imaging three times to obtain a set of image frame pairs of three pairs (6 frames), the first and second image sensors in FIG. 9 each include at least two sub-image sensors sharing at least part of the optical path, and the at least two sub-image sensors respectively image different patterns of structured light successively projected by the projection unit.

FIG. 9 shows an example in which the first and second image sensors each include two sub-image sensors (photosensitive units). As shown, the first image sensor 920 includes sub-image sensors 923 and 924, and the second image sensor 930 includes sub-image sensors 933 and 934. The sub-image sensors 923 and 924 share an optical path up to the beam splitting surface of the beam splitting element 922 and are at equal distances from the beam splitting surface. Likewise, the sub-image sensors 933 and 934 share an optical path up to the beam-splitting surface of the beam-splitting element 932 and are at equal distances from the above-mentioned beam-splitting surface. In other words, the present disclosure introduces sets of binocular structures coaxial with each other. Here, the sub-image sensors 923 and 933 are regarded as the first set of image sensors (the first group of binoculars), which are used to image the structured light of the first pattern among the three patterns in FIG. 4. Subsequently, sub-image sensors 924 and 934, considered as a second set of image sensors (second set of binoculars), are used to image the structured light of the second of the three patterns. In other words, it can be considered that the sub-image sensors 924 and 934 that are coaxial with 923 and 933 respectively are in situ, replacing 923 and 933 to perform imaging of the latter pattern structured light. Thus, the imaging interval of two adjacent frames can be imaged at a smaller interval without depending on the frame interval of each image sensor.

Therefore, the measuring camera 800 or 900 further includes: a synchronization unit, configured to cause at least two sub-image sensors (the image sensor 820 or the first and second image sensors 920 and 930 each include) to sequentially image the at least two different structured light patterns at a first interval synchronously, while the projection unit projects at least two different patterns of structured light at the first interval, wherein the first interval is smaller than a frame imaging interval of the sub-image sensors. Correspondingly, each sub-image sensor still performs its next frame imaging at a second interval, and the imaging operation can be synchronized with the projection operation of the projection unit under the synchronization of the synchronization unit, wherein the second interval is not smaller than the frame imaging interval of the sub-image sensor (for example, imaging at its own frame interval).

Figure 10:
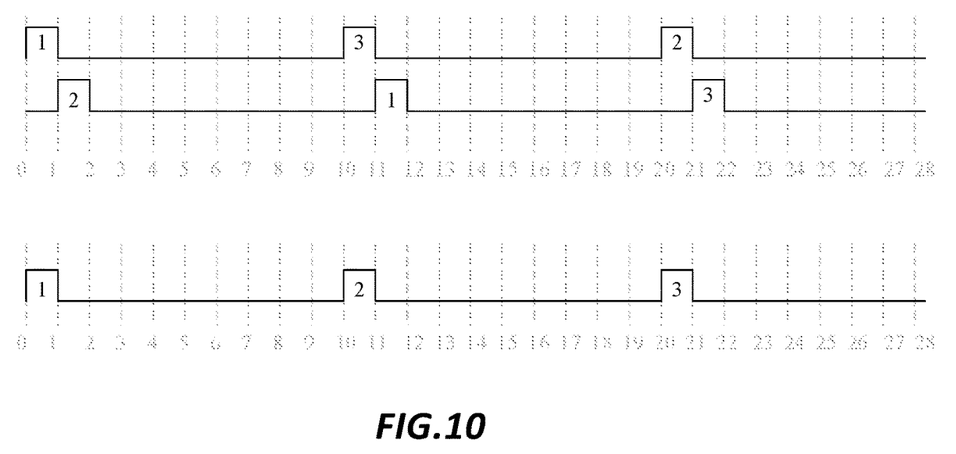
FIG. 10 shows a timing diagram of a comparison between two sets of coaxial binocular imaging and one set of binocular imaging.

FIG. 10 shows a timing diagram of a comparison between two sets of coaxial binocular imaging and one set of binocular imaging. For the convenience of illustration, it is assumed that the frame rate of each photosensitive unit (sub-image sensor) is 100 frames/s, and its frame interval is 10 ms, and the exposure time required by each photosensitive unit is 1 ms.

If the image sensor 820 or the first and second image sensors 920 and 930 are conventional image sensors including only a single photosensitive unit, when the three patterns shown in FIG. 4 are to be used for depth data calculation, as shown in the lower part of FIG. 10, three imaging is required, respectively at $0^{th}$, $10^{th}$ and $20^{th}$ ms. Therefore, compositing each depth data image requires the subject to remain still for $21^{th}$ ms (making it harder to capture moving subjects), and the frame rate drops from 100 frames/s to 33.3 frames/s.

In contrast, if the image sensor includes two photosensitive units, when using, for example, three patterns for depth data calculation, as shown in the upper part of FIG. 10, the first set of photosensitive units performs imaging for pattern 1 at $0^{th}$ ms, and then the second group of photosensitive units performs imaging for pattern 2 at $1^{st}$ ms, and then after an interval of 10 ms, the first group of photosensitive units performs imaging for the pattern 3 at $10^{th}$ ms, thus completing the three imaging required for one depth data image. Subsequently, at $11^{th}$ ms, the second set of photosensitive units can start the next round of imaging for pattern 1. At $20^{th}$ ms, the first set of photosensitive units performs imaging for pattern 2. At $21^{th}$ ms, the second set of photosensitive units performs imaging for the pattern 3 again. Thus, the imaging interval of different sets of photosensitive units only needs to be separated by the time required for imaging (for example, 1 ms), and the re-imaging interval of the same group of photosensitive units still follows the frame interval time corresponding to the frame rate (for example, 10 ms). Therefore, by introducing two sets of coaxial binoculars, compositing each depth data image only requires the subject to remain still for 11 ms (thus making it easier to capture moving subjects), and the frame rate can be maintained at close to 66.6 frames/s.

Figure 11:
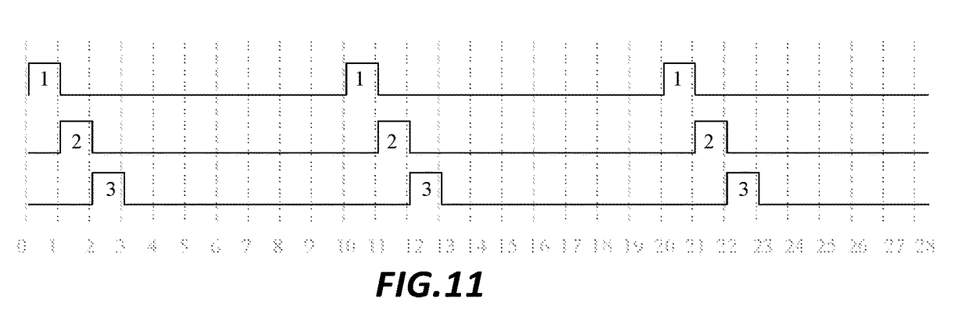
FIG. 11 shows a timing diagram of three sets of coaxial binocular imaging.

Although an example with two groups of coaxial photosensitive units is described in conjunction with FIGS. 8-10, in other embodiments, each of the first and second image sensors can include more photosensitive units. FIG. 11 shows a timing diagram of three sets of coaxial binocular imaging. Each of the first and second image sensors includes coaxial three photosensitive units (sub-image sensors). As shown, the imaging of pattern 1 is performed by the first group of photosensitive units at $0^{th}$ ms, followed by the imaging of pattern 2 by the second set of photosensitive units at $1^{st}$ ms, followed by the imaging of pattern 3 by the third set of photosensitive units at $2^{nd}$ ms. Subsequently, the next round of three sets of imaging starts at 10 mis, the next round of three sets of imaging starts at 20 ms, and so on. Therefore, by introducing three sets of coaxial binoculars, it only takes 3 ms to obtain three sets of images (6 frames) required to synthesize a depth data image, that is, the subject only needs to remain still for 3 ms, which greatly improves the ability to shoot moving objects, and the frame rate can be kept close to 100 frames per second (in this example, it takes 1003 ms, or 1.003 s to shoot 100 frames).

It should be understood that simply by introducing an additional set of coaxial binocular structures (or monocular structures), the frame rate of depth data based on multi-frame synthesis can be doubled and the imaging time of each frame can be shortened. Theoretically, coaxial binocular structures with the same number of images projected by the projection unit can be arranged, so that the frame time of each depth frame and the frame interval of the sensor are only related to the multiple of the exposure time (when frame interval>exposure time×number of coaxial structure sets). For example, in the case of synthesizing depth frames based on four patterns, if two sets of coaxial binoculars are used as shown in FIG. 9, the imaging time for acquiring four frames increases slightly to 12 ms, but the frame rate drops to nearly 50 frames/s. But if four sets of coaxial binoculars are used, the imaging time for acquiring four frames is only 4 ms, and the frame rate remains close to 100 frames/s. However, introducing too many coaxial structures will increase the difficulty of constructing the image sensor, which requires a compromise between cost, feasibility and imaging speed.

In order to realize the coaxial configuration of different photosensitive units in the same image sensor, it is necessary to design the optical path.

In the example in FIG. 9, a coaxial arrangement based on beam splitting is shown (the example in FIG. 8 also has a similar structure). Taking the first image sensor 920 as an example, one image sensor includes: a lens unit 921 for receiving the incident return structured light; a beam splitter 922 for dividing the incident return structured light into at least a first beam and a second beam; the first sub-image sensor 923 is configured to image the first light beam; and the second sub-image sensor 924 is configured to image the second light beam corresponding to the returned structured light of different patterns.

In one embodiment, the beam splitting device 922 is an optical prism, such as a square prism or a triangular prism. Thus, the reflected light in the incident light reaches the second sub-image sensor 924, and the unreflected light in the incident light can travel straight to the first sub-image sensor 923.

As shown, the beam splitting device 922 in the form of a prism can split the incident light into two beams whose propagation directions are perpendicular to each other. Correspondingly, the first sub-image sensor 923 and the second sub-image sensor 924 can be arranged perpendicularly to each other so as to respectively receive the incident beams at a vertical angle.

To eliminate parallax and achieve pixel-level or near-pixel-level alignment, components in the incident light need to have the same optical path. For this reason, in the case of using a quadrangular prism as the beam splitting element 922, the first sub-image sensor 923 and the second sub-image sensor 924 can be arranged at an equal distance from the beam splitting surface of the beam splitting element 922. In the case of using a prism as the beam splitting element 922, the distance between the two photosensitive units and the beam splitting device 922, especially the beam splitting surface, can be flexibly adjusted according to the ratio of the refractive index of the air to the prism material.

Pixel-level alignment or approximate alignment between the first sub-image sensor 923 and the second sub-image sensor 924 can be theoretically achieved by making incident light share most of the optical path and have the same optical path. However, in the actual manufacturing process of the image sensor, the actual arrangement of the first sub-image sensor 923 and the second sub-image sensor 924 cannot present an ideal vertical and equidistant condition, resulting in a deviation between the imaging of the two. As a result, forced software corrections can be performed on fabricated image sensors. For example, by introducing a calibration target and aligning the images of the first sub-image sensor 923 and the second sub-image sensor 924 with the calibration target, real pixel-level correction can be realized.

In one embodiment, before the light beam enters the first sub-image sensor 923 and the second sub-image sensor 924, it also passes through a filter to further filter out the influence of light of other wavelengths. In one embodiment, the projection unit can project infrared laser light, so the optical filter arranged in the image sensor can be a corresponding infrared light transmission unit, which is used to transmit infrared light in a specific frequency range, for example, the 780-1100 nm infrared light wavelength used in this disclosure. In other embodiments, the projection unit can also project visible light, such as projecting red laser light or blue laser light, such as 635 nm red light or 450 nm blue light. Although the ambient light may also include red light or blue light, due to the short exposure time and high instantaneous laser light intensity, it is also possible to perform high signal-to-noise ratio imaging with the help of corresponding red or blue light transmitting filters. In case the projection unit projects visible light, e.g., red light, the first and second sub-image sensors are implemented as visible light sensors respectively.

Preferably, when the beam splitting device is a square prism, one side of the filter can be in direct physical contact with the square prism, and the other side is in physical contact with the photosensitive unit, while the photosensitive unit and the square prism are clamped in the housing. This ensures height invariance of the relative positions of the individual elements.

In some embodiments, especially in the case where the first and second sub-image sensors are infrared light sensors for receiving projected infrared patterns, an additional visible light sensing unit (not shown in the figure) can also be arranged in the image sensor output) and is used to capture the image information of the measured object, so that the image captured by the image sensor contains both the image information and the depth information of the measured object. The visible light sensing unit can be a grayscale sensor or a color sensor. The grayscale sensor only captures brightness information, while the color sensor can be used to capture the color information of the measured object. The visible light sensing unit can be composed of three primary color sensing units, where the three primary colors can be red, green, blue (RGB) or cyan, red, yellow (CMY).

It should be understood that although the structure of the first image sensor 920 is specifically described above, the second image sensor 930 can also have the same structure. In addition, it should be understood that 923 and 933 can be regarded as the first set of binoculars, 924 and 934 can be regarded as the second set of binoculars, but 923 and 934 can also be regarded as the first set, 924 and 933 can be regarded as the second set, if only it can be turned on for imaging after the corresponding pattern is incident.

In the case of using beam splitting to achieve optical path sharing as shown in FIG. 9, since the light acquired by each photosensitive unit will decrease, the sensitivity or effective distance range of imaging can be ensured by increasing the projected brightness or expanding the incident aperture.

Alternatively, optical path sharing can be realized based on optical path switching. Therefore, the image sensors can each include: a lens unit for receiving the incident return structured light; an optical path conversion unit for delivering the incident return structured light to at least the first sub-path and the second sub-path; the first sub-image sensor, configured to image the returned structured light on the first sub-path; the second sub-image sensor, configured to image the returned structured light corresponding to different patterns on the second sub-path. In one embodiment, the optical path conversion unit is a rotating mirror, which can reflect the incident light to the photosensitive unit 923, for example, at $0^{th}$ ms, reflect the incident light to the photosensitive unit 924 at $1^{st}$ ms, and so on. In other embodiments, the optical path conversion unit can be an element that performs optical path conversion based on other mechanical, chemical or electrical principles.

The above-mentioned beam splitting element or the optical path conversion unit can be regarded as an optical path conversion unit, which is used to change the optical path to deliver the incident return structured light to the first sub-image sensor and the first sub-image sensor. In other embodiments, other optical path conversion units such as optical fiber guiding units can also be used.

The solution of arranging multiple sub-image sensors coaxially as above can be implemented as a monocular or binocular stripe light projection solution, or a binocular speckle projection solution. Among them, the line-shaped light stripe pattern projection is especially suitable for combining with rolling shutter exposure, thereby realizing the depth data measurement with high anti-interference coefficient, especially suitable for measuring target objects outdoors and under sunlight, for example, it can be realized as a car damage tester and so on. The speckle measurement solution is suitable for depth measurement of continuous planes, for example, for loading and unloading materials or welding seam inspection in shipyards. In some embodiments, a visible light sensor can also be included in the multiple sub-image sensors arranged coaxially, for example, to turn on when the corresponding pixel is not illuminated by actively projected infrared light, so as to acquire a visible light two-dimensional image of the shooting area.

It can be seen from the above that the structured light projection unit and the depth data measuring device of the present disclosure can cooperate with multiple pairs of binocular sensors sharing an optical path, thereby further shortening the frame interval and improving the quality of the fused depth data.

Having described various embodiments of the present disclosure above, the foregoing description is exemplary, not exhaustive, and is not limited to the disclosed embodiments. Many modifications and alterations will be apparent to those of ordinary skill in the art without departing from the scope and spirit of the described embodiments. The terminology used herein is chosen to best explain the principle of each embodiment, practical application or improvement of technology in the market, or to enable other ordinary skilled in the art to understand each embodiment disclosed herein.

What is claimed is:

1. A depth data measuring device comprising:
a projection unit configured to project a set of structured light with different patterns to a subject in a shooting area, the set of structured light includes at least two structured light with different patterns
one or two image sensors configured for depth imaging, and each image sensor among the one or two image sensors is configured to photograph the subject and output a set of image frames illuminated by the set of structured light for a single depth data calculation of the shooting area,
wherein the projection unit comprises:
a laser configured to generate laser light;
a LCOS (Liquid Crystal on Silicon) element configured to receive the generated laser light and generate the set of structured light,
wherein each image sensor among the one or two image sensors comprises at least two sub-image sensors sharing at least part of an optical path, and the at least two sub-image sensors are configured to respectively image different patterns of structured light successively projected by the projection unit.

2. The depth data measuring device of claim 1, wherein the laser comprises:
a VCSEL (Vertical Cavity Surface Emitting Laser).

3. The depth data measuring device of claim 2, wherein the VCSEL generates polarized light, and the LCOS element is configured to control the reflection of the light by adjusting phase difference of liquid crystal corresponding to each pixel.

4. The depth data measuring device of claim 2, wherein the VCSEL comprises a light-emitting array composed of a plurality of light-emitting cells, and the VCSEL turns off a specific row, column or light-emitting cell according to the projected structured light pattern when emitting laser light.

5. The depth data measuring device of claim 1, wherein the one or two image sensors comprise:
one image sensor with a fixed relative distance from the projection unit, wherein a two-dimensional image frame of the set of image frames captured by the one image sensor is used for comparison with a reference structured light image frame to obtain the depth data of the subject.

6. The depth data measuring device of claim 1, wherein the set of structured light projected by the projection unit is a set of infrared structured light, and the depth data measuring device further comprises:
a visible light sensor configured to photograph the subject and output a two-dimensional image frame illuminated by visible light.

7. The depth data measuring device of claim 1, wherein the LCOS element is configured to:
project the set of structured light formed by projecting encoded speckles in a two-dimensional distribution.

8. The depth data measuring device of claim 1, wherein the LCOS element is configured to:
sequentially project the set of structured lights with different stripe codes.

9. The depth data measuring device of claim 8, wherein the LCOS element is configured to:
project the stripe codes in a scanning manner, and
each image sensor among the one or two image sensors comprises:
a rolling shutter sensor configured to synchronously turn on the pixel column in the stripe direction corresponding to the current scanning position for imaging.

10. The depth data measuring device of claim 8, wherein the laser is a VCSEL comprising a light-emitting array of a plurality of light-emitting cells, and is configured to:
partially light up the column of VCSEL light-emitting cells,
each image sensor among the one or two image sensors comprises:
a rolling shutter sensor configured to synchronously turn on the pixel column in the stripe direction corresponding to the position illuminated by the currently lit light-emitting cell column for imaging.

11. The depth data measuring device of claim 1, wherein the projection unit is configured to:
in one imaging cycle, project a stripe-coded pattern in multiple time periods, wherein each time period projects a part of the pattern, and the parts projected in the multiple time periods can be combined into a complete stripe coding pattern,
each image sensor among the one or two image sensors is configured to:
in each time period, turn on the pixel column corresponding to the projected part of the pattern for imaging the projected part of the pattern, and turn on pixel columns different from the pixel column for imaging the ambient light.

12. The depth data measuring device of claim 1, wherein the at least two sub-image sensors are configured to sequentially image at least two structured light with different patterns from the set of structured light at a first interval synchronously, while the projection unit projects the at least two structured light with different patterns at the first interval, wherein the first interval is smaller than a frame imaging interval of the sub-image sensors.

13. The depth data measuring device of claim 12, wherein each sub-image sensor is configured to perform its next frame imaging at a second interval, which is synchronized with the projection operation of the projection unit, wherein the second interval is not smaller than the frame imaging interval of the sub-image sensor.

14. The depth data measuring device of claim 1, wherein each image sensor among the one or two image sensors is configured to receive an incident return structured light, and wherein a first sub-image sensor and a second sub-image sensor, selected from the at least two sub-image sensors, are configured to image different patterns at different times, and each image sensor among the one or two image sensors is further configured to change the optical path to deliver the incident return structured light to the first sub-image sensor and the second sub-image sensor.

15. The depth data measuring device of claim 1, wherein the one or two image sensors configured for depth imaging comprise:
a first image sensor and a second image sensor, whereint the first and second image sensors correspond to the two image sensors when the one or two image sensors comprises two omage sensors, the first and second image sensors have a fixed relative distance from the projection unit and are configured to photograph the subject and output the set of image frames illuminated by the set of structured light, and the set of image frames illuminated by the set of structured light comprises a first set of two-dimensional image frames output by the second image sensor, wherein the depth data of the subject is obtained based on the first and second sets of two-dimensional image frames and the predetermined relative positional relationship between the first and second image sensors.

* * * * *